United States Patent [19]
Gianessi

[11] 3,927,729
[45] Dec. 23, 1975

[54] APPARATUS FOR DETACHABLY MOUNTING AN ENGINE BELLY GUARD TO A VEHICLE MAIN FRAME

[75] Inventor: Albert Gianessi, East Peoria, Ill.

[73] Assignee: Caterpillar Tractor Co., Peoria, Ill.

[22] Filed: Jan. 20, 1975

[21] Appl. No.: 542,322

Related U.S. Application Data

[62] Division of Ser. No. 416,731, Nov. 19, 1973, Pat. No. 3,874,624.

[52] U.S. Cl. ............................. 180/69.1; 296/35 A
[51] Int. Cl.² ....................................... B62D 25/20
[58] Field of Search ..... 180/69.1, 54 F, 54 E, 54 D, 180/89; 296/35 A, 35 R; 151/41.74, 41.7, 41.73, 41.76

[56] References Cited
UNITED STATES PATENTS

| | | | |
|---|---|---|---|
| 1,444,310 | 2/1923 | Fishburn | 180/69.1 |
| 2,005,103 | 6/1935 | Moorhouse | 296/35 R |
| 2,243,923 | 6/1941 | Swanstrom | 151/41.76 |
| 2,986,188 | 5/1961 | Karp et al. | 151/41.73 |
| 3,123,120 | 3/1964 | Grimm et al. | 151/41.7 |
| 3,208,766 | 9/1965 | Domes | 180/69.1 X |
| 3,695,324 | 10/1972 | Gulistan | 151/41.74 |
| 3,874,624 | 4/1975 | Gianessi | 180/69.1 X |

Primary Examiner—M. H. Wood, Jr.
Assistant Examiner—Milton L. Smith
Attorney, Agent, or Firm—Ralph E. Walters

[57] ABSTRACT

A connector nut has a pair of oppositely extending stub shafts which are normal to its threaded bore. The stub shafts are loosely cradled in upwardly opening recesses of a pair of laterally spaced bracket plates secured to a sidewall of the main frame so that the connector nut is movable to permit its alignment for screw threaded engagement with a mounting bolt received through the engine belly guard. A flange provided at the lower end of the connector nut and a pin cooperate to keep the stub shafts in torque transmitting engagement in their recesses to facilitate assembly with the bolt. The pin is detachably mounted between the bracket plates to permit the easy removal of the connector nut for replacement purposes. A shear block secured to the main frame and received through a mating opening in the belly guard carrys any horizontal loads imparted on the belly guard during operation to alleviate shearing forces on the bolt and connector nut.

7 Claims, 4 Drawing Figures

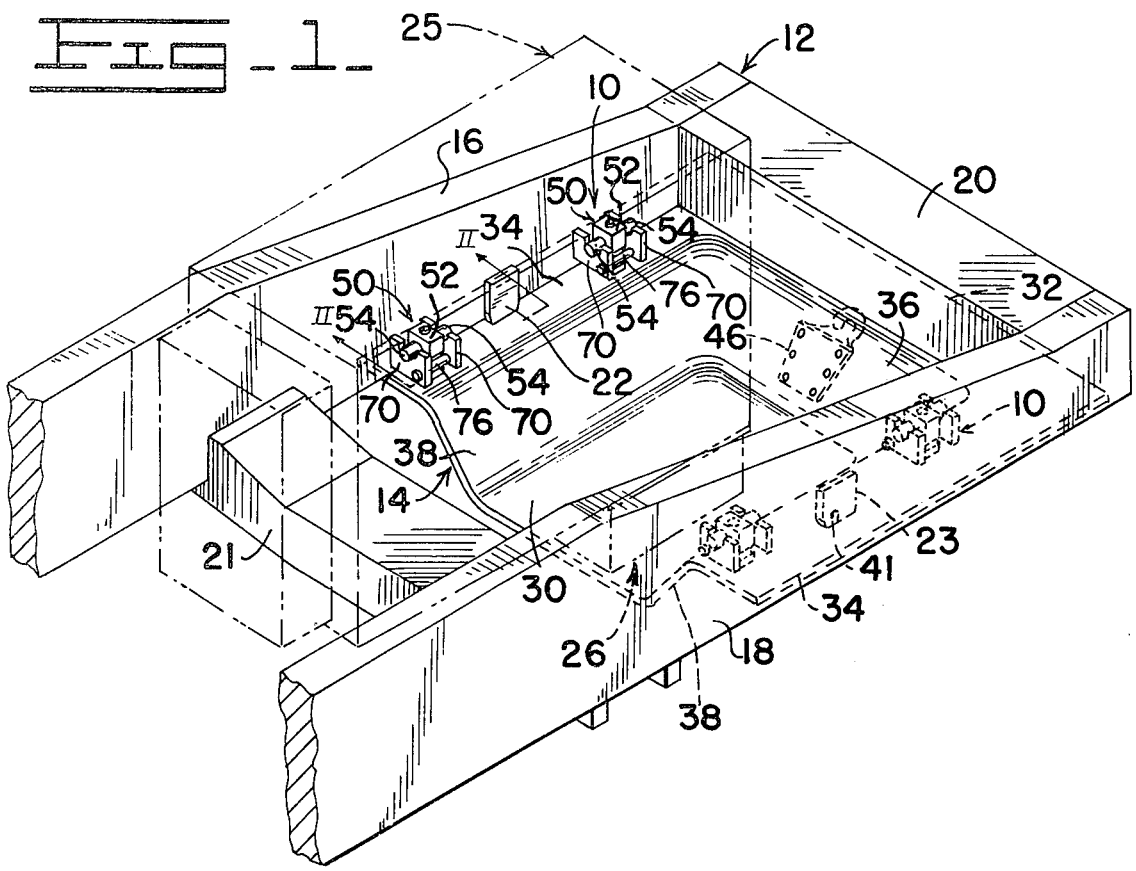

APPARATUS FOR DETACHABLY MOUNTING AN ENGINE BELLY GUARD TO A VEHICLE MAIN FRAME

CROSS REFERENCE TO RELATED APPLICATIONS

This is a division of application Ser. No. 416,731, filed Nov. 19, 1973, now U.S. Pat. No. 3,874,624.

BACKGROUND OF THE INVENTION

Relatively large housings, such as engine belly guards and the like, for heavy earthmoving vehicles have in the past been difficult to install particularly in view of the problems encountered in providing acceptably close registry of the fastener openings in the housing with their associated fastener receiving locations on the supporting vehicle main frames. It is common practice to secure a plurality of internally threaded weld nuts or tapping strips to the frame as by welding or the like and to extend threaded bolts through suitable openings in the housing for threading into such weld nuts or strips. These large vehicle frames and removable housings are normally fabricated and/or formed having a considerable manufacturing tolerance range because of their size and the lack of precision in the manufacturing technique normally used which greatly aggravates the alignment problem. Corrosion and rusting of the threads and wear or other damage to the bolt heads often require that the bolts be burned off for service removal of the housings. When this occurs, it is necessary to rework the internally threaded nuts or tapping strips after such destructive removal of the bolts and their replacement effected by welding in order to permit the reinstallation of the housings. It will be apparent to those skilled in the art that such procedures are tedious, time-consuming and expensive both during initial assembly and during their replacement after subsequent servicing of any internal vehicle components covered by the housings.

Examples of prior art attempts to overcome the alignment problem with fastening devices for securing separable members are found in U.S. Pat. Nos. 3,695,324 to Gulistan, 3,123,120 to Grimm et al., 2,986,188 to Karp et al., and 2,243,923 to Swanstrom.

SUMMARY AND OBJECTS OF THE INVENTION

Accordingly, it is an object of this invention to provide apparatus for detachably mounting a relatively large engine belly guard to the bottom of a vehicle main frame which alleviates alignment problems due to manufacturing tolerances and the like.

Another object of this invention is to provide apparatus capable of transmitting relatively large horizontal loads imparted on the belly guard during operation to the main frame without any injury to fastening members of such apparatus.

Another object of this invention is to provide such apparatus of the character described which includes a connector nut carried by the main frame in an easily removable manner to permit its convenient replacement when desired.

Other objects and advantages of the present invention will become more readily apparent upon reference to the accompanying drawings and following description.

BRIEF DESCRIPTION OF THE DRAWINGS

FIG. 1 is a perspective view of a vehicle frame having a belly guard secured thereto by apparatus embodying the principles of the present invention.

FIG. 2 is a somewhat enlarged longitudinal vertical sectional view with portions in elevation taken generally along the line II—II of FIG. 1.

DESCRIPTION OF THE PREFERRED EMBODIMENT

Figure 3:
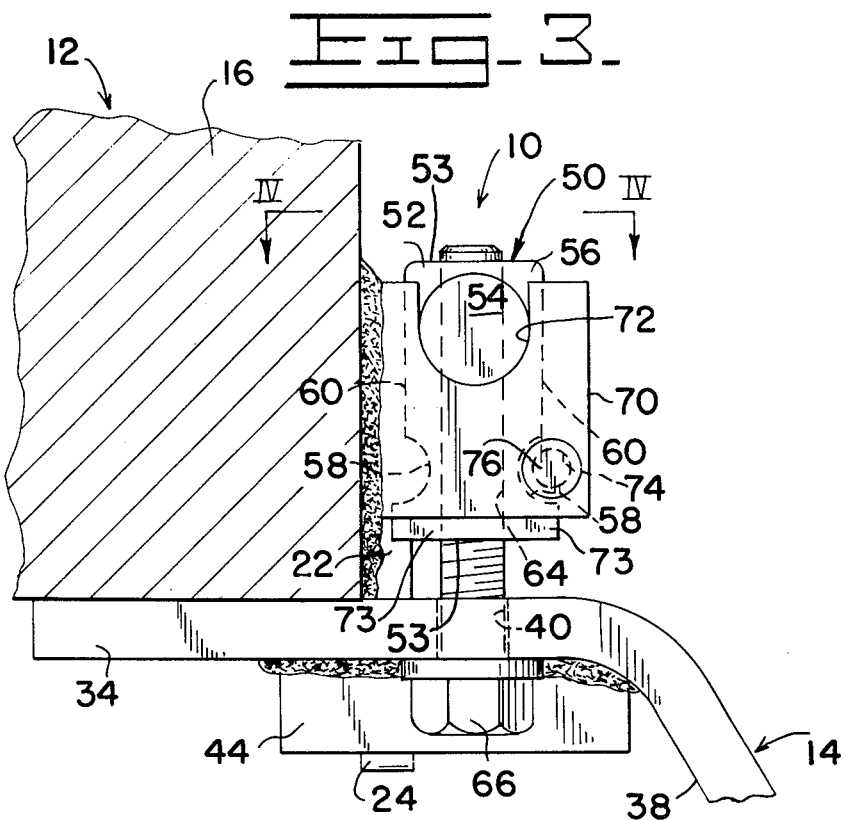
FIG. 3 is a transverse vertical sectional view with portions in elevation taken generally along the line III—III of FIG. 2.
Figure 4:
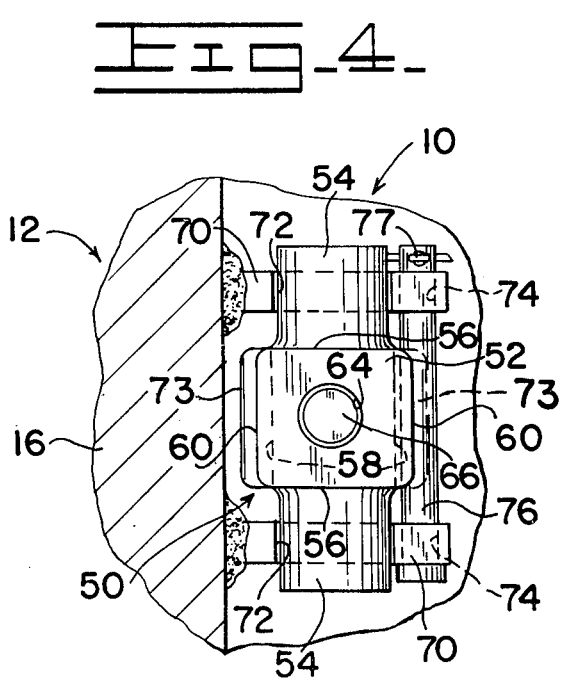
FIG. 4 is a transverse horizontal sectional view with portions in elevation taken generally along the line IV—IV of FIG. 3.

Referring more particularly to the drawings, an improved connector assembly embodying the principles of the present invention is generally indicated by the reference numeral 10 as operatively disposed in connecting relation between a pair of interfitting elements, such as a frame 12 and a guard 14. The frame includes a pair of laterally spaced elongated side rails 16 and 18 interconnected at their outer ends by a transversely extending cross member 20 and at a point somewhat rearwardly thereof by a lower cross member 21. A pair of shear blocks 22 and 23 are individually secured by welding in laterally spaced, aligned relation to the inner sidewalls of the frame side rails. Each of the shear blocks include a tapered lower end portion 24 extending below the lower extreme of its respective side rail. The frame 12 is illustrated as a main frame for an earthmoving vehicle, such as a crawler tractor, which is adapted to support an internal combustion engine, shown in broken lines and indicated generally by the reference numeral 25.

The engine 25 includes an oil pan indicated generally at 26 which is secured to the lower surface thereof for storage of an adequate supply of lubricating fluid for the working components within the engine. Since engine oil pans are generally made from relatively light sheet stock, it is necessary in most earthmoving vehicles to provide guard members beneath the frame to protect the oil pan from damage due to contact with large boulders or stumps during operation of the vehicle. For this purpose, the guard 14 is illustrated as a relatively large engine belly guard which is removably secured to the bottom of the frame side rails 16 and 18 by a plurality of the connector members 10. The guard is a three-sided pan shaped member having a generally horizontally disposed bottom wall 30 bounded by horizontally arranged elevationally spaced front and side mounting flanges 32 and 34, respectively. The bottom wall 30 is integrally interconnected with the front flange 32 by a forwardly and upwardly inclined wall 36 and to the side flanges 34 by outwardly and upwardly angled sidewalls 38.

The side flanges 34 of the guard 12 individually include a plurality of bolt receiving openings 40 as best seen in FIGS. 2 and 3. A generally rectangularly shaped tapered opening 41 is provided in each of the side flanges for purposes hereinafter explained. Each of the openings is aligned with a tapered opening 42 formed by a reinforcing block 44 secured by welding in circumscribing relation to the opening 41 to the lower side of each of the side flanges 34. A towing attachment or hook 46 is secured to the front surface of the inclined wall 36 to provide towing capability for the vehicle.

The connector assembly 10 includes a connector nut 50 having an elongated rectangular body 52. The body has opposite upper and lower ends 53 and a pair of oppositely directed stub shafts 54 extending from opposite front and rear facing sides 56 of the body along a common axis to define a mounting axis X. The body further includes a pair of semi-cylindrical grooves 58 formed in outwardly opening relation in the opposite inner and outer sides 60 of the body. A central, vertically disposed threaded bore 64 is provided through the connector nut and defines a securing axis Y normal to the mounting axis X.

Each of the connector nuts 50 is loosely, nonrotatably retainably supported relative to the frame 12 by a pair of upright inwardly extending bracket plates 70. Each of such bracket plates are individually provided with an upwardly opening semicircular bearing recess 72. Such recesses are adapted rotatably to receive the stub shafts 54 of the connector nut. The recesses are positioned in the bracket plates so that the connector nut is located in spaced relation to the adjacent sidewall of frame side rails. The body of the connector nut 50 is also provided with a pair of outwardly projecting stop flanges 73 extending from its inner and outer sides 60 adjacent the lower end thereof, with the stop flange on the inner side being normally disposed in slightly spaced relation to the sidewall of the main frame to limit pivotal movement of the connector nut theretowards.

Each of the pairs of bracket plates 70 includes aligned horizontally extending holes or bores 74 which are disposed in essentially coaxial relation to the outermost one of the semicylindrical grooves 58. An elongated lock pin 76 extends through the holes 74 and is secured therein by a cotter pin 77 and is partially received within the outermost groove 58. The groove is formed with a greater diameter than the pin 76 so as to define an annular space therebetween when axially aligned to define the amount of pivotal movement allowed theretowards.

Operation

During initial assembly, the several pairs of bracket plates 70 are secured to the inner sidewalls of the frame side rails 16 and 18. The connector nuts 50 are then individually installed in an associated pair of the bracket plates by nesting the stub shafts 54 thereof within the recesses 72 so that the body 52 of the connector nut is suspended in pivotal relation between the bracket plates. The provision of a pair of oppositely facing grooves allows installation of the connector nut in either of the two 180° positions in which the stub shafts are engageable with the recesses. The pin 76 is then inserted into the aligned holes 74 for partial receipt within the groove 58. The annular space between the groove and the pin and the space between the nut engaging surface on the sidewall of the frame and the adjacent stop flange 73 permits limited pivotal movement of connector nut between engagement with the pin in one direction and engagement with the sidewall in the other direction to cooperatively define the total amount of pivotal movement allowed the connector nut.

Disengagement of the stub shafts 54 from their respective recesses 72 through upward movement of the connector nut is prevented by engagement of the pin 76 with the adjacent stop flange 73 which continually underlies the pin throughout the total pivotal movement of the connector nut. The longitudinal spacing of the bracket plates 70 relative to the width of the connector nut body 52 permits limited movement of the nut relative to the bracket by sliding of the stub shafts in the recesses 72.

The guard is then fitted into place below the frame 12 and is horizontally fixedly located with respect thereto by the closed fitting receipt of the tapered end portions 24 of the shear blocks 22 and 23 in their associated tapered openings 41 and 42 in the side flanges 34 and the reinforcing blocks 44, respectively, as best shown in FIG. 2. Due to the manufacturing tolerances denoted earlier, the bolt receiving openings 40 may not exactly line up with their respective connector nuts 50. This misalignment problem is overcome by the present invention through the ability to individually align each of the connector nuts with its associated bolt receiving opening through the appropriate longitudinal sliding and/or pivotal motion of each of the connector nuts. This permits the insertion of the bolts 66 through their respective bolt receiving openings 40 into screw threaded engagement with the threaded bore 64 of the associated connector nuts. By tightening such bolts, the guard is securely and removably attached to the frame 12.

In addition to locating the guard 14, the shear blocks 22 and 23 are utilized for transferring relatively large horizontal forces exerted on the guard directly to the frame side rails 16 to avoid shearing of the bolts 66. It will be appreciated that such horizontal forces are frequently exerted on the guard in the performance of its protective duties when the vehicle runs over boulders, stumps and the like during operation. Such horizontal forces are transferred through load bearing contact between the tapered end portion of the shear blocks and the associated surfaces of the tapered openings 41 and 42 and not through the bolts 66.

It is often necessary to remove the guard 14 for servicing of the engine or related components after extensive periods of field operation. Since the connector assemblies are exposed to the elements and the heads of the bolts 66 are exposed to wear, the threaded connection between the connector nut 52 and the bolt may freeze due to rust or corrosion or the head may become so worn as to preclude wrenching of the bolt therefrom. For these reasons it is often necessary to torch cut the head from the bolts 66 to permit removal of the guard and the subsequent servicing of the machine. Should this occur, the connector nuts 50 may be released by removal of the pin 76 so as to permit their replacement with a new connector nut whereby a new bolt may be engaged therewith upon reassembly of the machine.

It is often necessary to tow a vehicle or for the vehicle to be used in towing some other object by attachment of a tow line to the hook 46 secured to the forward wall 36 of the guard 12. Since such towing can also apply relatively large horizontal loads to the guard, the shear blocks are further utilized to transfer such loading directly to the frame in the manner previously described.

In view of the foregoing, it is readily apparent that the connector assemblies 10 and the shear blocks 22 provide improved apparatus for removably securing an engine belly guard to a vehicle main frame. The connector assemblies include a connector nut which is loosely, nonrotatably, retainably carried on the frame and to permit its alignment for screw threaded engagement with the mounting bolt received through the belly guard to accommodate variations in tolerances. The particular mounting of the connector nut permits its limited pivotal and sliding movement relative to the frame. The connector nut is further releasably secured to the frame so as to permit its convenient and ready replacement should it become damaged or unremovably frozen on the bolt.

While the invention has been described and shown with particular reference to the preferred embodiment, it will be apparent that variations might be possible that would fall within the scope of the present invention which is not intended to be limited except as defined in the following claims.

What is claimed is:

1. Apparatus for detachably mounting an engine belly guard to the bottom of a vehicle main frame, which belly guard has a bolt receiving opening therethrough disposed in spaced relation adjacent a generally upright sidewall of such main frame, comprising:

an elongated bolt upwardly extendable through said bolt receiving opening of the belly guard and positionable in retaining engagement thereagainst;

a connector nut having a threaded bore screw threadably engageable with said bolt;

means for mounting said connector nut to said sidewall of the main frame which effectively retains the connector nut against rotation about its threaded bore to facilitate the threaded engagement of the bolt for assembly therewith and which allows limited movement of the connector nut in directions other than the rotary movement about its threaded bore to permit the proper axial alignment of the connector with the bolt; means forming a generally rectangularly shaped, axially tapered opening through said belly guard; and a generally rectangularly shaped shear block secured to the main frame and having a tapered end portion extending therebelow for close mating receipt within said tapered opening of the belly guard so that relatively large horizontal loads imparted on the belly guard are transmitted through the shear block to alleviate shearing forces on the bolt.

2. The apparatus of claim 1 wherein;

said means for mounting said connector nut includes a pair of upright bracket plates extending transversely from the sidewall of the main frame in laterally spaced relation on opposite sides of the connector nut, each of the bracket plates having an upwardly opening recess therein with such recesses being in aligned relation with each other; and said connector nut includes a pair of oppositely extending stub shafts which shafts are disposed along a mounting axis normal to the threaded bore of the connector nut, each of the stub shafts being disposed in cradled receipt within respective ones of the upwardly opening recesses of the bracket and with the connector nut being sized so as to permit swinging movement about and limited sliding movement along said mounting axis between the side plates for alignment purposes.

3. The apparatus of claim 2 including means selectively operable for positively retaining the stub shafts of the connector nut in torque transmitting engagement within their respective recesses of the bracket plates in one instance and for permitting the ready disassembly of the connector nut from the bracket plates in another instance.

4. The apparatus of claim 3 wherein said connector nut includes an elongated body having opposite upper and lower ends normal to said threaded bore, a first pair of opposite sides normal to said bracket plates, and a second pair of opposite sides normal to said first pair of sides with said stub shafts extending from respective ones of said second pair of sides, and wherein;

said means for retaining the stub shafts includes an elongated pin, a pair of outwardly projecting flanges extending from respective ones of said first pair of side sadjacent the lower end of the body, and a pair of aligned bores individually formed in the bracket plates for mounting the opposite ends of the pin, said bores being positioned so that said pin is located in slightly spaced relation above the flange on the side of the body remote from the sidewall of the main frame and in normally offsetting relation to such side so as to limit pivotal movement of the connector nut about its mounting axis theretowards, and with the flange adjacent the sidewall of the main frame being normally spaced a predetermined distance therefrom so as to limit pivotal movement of the connector nut theretowards so that the opposite flange continuously underlies said pin throughout the entire pivotal movement provided between the sidewall and the pin so as to prevent upward disengagement of the stub shafts from their respective recesses.

5. The apparatus of claim 4 including means for removably securing said pin within said aligned bores to permit its removal so as to allow the disassembly of the connector nut from the bracket plates for replacement purposes.

6. The apparatus of claim 5 including an outwardly opening semicylindrical groove in the side adjacent said pin and in coaxial relation therewith so as to increase the amount of pivotal movement allowed said connector nut without having to unduly extend its underlying flange so that the body of said connector nut is provided with greater compactness.

7. The apparatus of claim 6 wherein the connector nut is provided with a similar outwardly opening semicylindrical groove along the other of the first pair of sides and wherein said flanges are identical so that said connector nut can be operatively reversibly installed within said bracket plates.

* * * * *